United States Patent [19]
Wolf

[11] 3,763,890
[45] Oct. 9, 1973

[54] FLOW-CONTROL VALVE

[75] Inventor: Karl Jean Wolf, Mannheim, Germany

[73] Assignee: Weinheimer Gummiwerke G.m.b.H., Weinheim, Germany

[22] Filed: Dec. 20, 1971

[21] Appl. No.: 209,708

[30] Foreign Application Priority Data
Apr. 21, 1971 Germany............... P 21 19 357.7

[52] U.S. Cl............ 137/614.17, 251/326, 137/454.6
[51] Int. Cl.............................................. F16k 3/12
[58] Field of Search............... 137/614.17, 614.16, 137/637.5, 637.4, 614.11, 454.5, 454.6; 251/315, 188, 324, 326

[56] References Cited
UNITED STATES PATENTS

| | | | |
|---|---|---|---|
| 831,018 | 9/1906 | Plough | 137/614.17 |
| 3,173,648 | 3/1965 | McGuire | 251/315 X |
| 3,526,249 | 9/1970 | Bavstian | 137/614.11 |
| 2,341,411 | 2/1944 | Ojalvo | 137/614.17 |
| 2,237,784 | 4/1941 | Iler | 137/614.16 |
| 1,689,296 | 10/1928 | Redding | 137/614.16 X |
| 2,929,406 | 3/1960 | Anderson | 137/615 |

*Primary Examiner*—Samuel Scott
*Assistant Examiner*—Ira S. Lazarus
*Attorney*—Karl F. Ross

[57] ABSTRACT

A valve for controlling the flow of a fluid has a housing with coaxial inlet and outlet ports on opposite sides of a transverse cylindrical chamber. A plunger axially movable in this cylinder has a cylindrical body terminating at its free end in a generally saddle-shaped formation with two convex ridges flanking the flow path, these ridges being separated by a depression of arcuate or trapezoidal profile bottoming substantially tangentially to the ports in a closure position in which the ridges enter a recess at the closed end of the housing. The cylindrical chamber and the recess may be formed in a partspherical insert which is rotatable within the housing about the cylinder axis to block the fluid flow while permitting withdrawal of the plunger for replacement or repair.

10 Claims, 8 Drawing Figures

Karl J. Wolf
INVENTOR.

BY Karl F. Ross
Attorney

Karl J. Wolf
INVENTOR.

BY

Karl F. Ross
Attorney

FLOW-CONTROL VALVE

My present invention relates to a valve for controlling the flow of a fluid between a pair of aligned conduits, i.e. to vary the flow rate in a predetermined manner between a maximum throughput and substantial cutoff. The performance of such valves is measured in terms of a flow coefficient $C_v$ defined as the flow rate (e.g. in m³/hr or gal./min) of water at a certain temperature (between 5° and 30°C) traversing the valve under a supply pressure creating a predetermined pressure drop (e.g. of 1 kp/cm² or 1 p.s.i.) at maximum lift $L_{max}$, i.e. in fully open position.

In many instances it is desirable that the coefficient $C_v$, if plotted against the lift L, should lie on a generally parabolic curve between a minimum regulated value $C_{vr}$ and a specified maximum value $C_{vs}$, the curve passing through a finite value $C_{vo}$ at the point L = 0. Between the cutoff point $C_v = 0$, which lies outside the curve, and the lowest regulated value $C_{vr}$, where the valve characteristic joins the curve, lies a region in which the flow rate varies in an indeterminate manner which is virtually uncontrollable with conventional valves wherein the oncoming fluid impinges upon the parabolically curved apex of a roughly conical valve body moving in axial direction of the inlet port. With such conventional valves, moreover, a complete cutoff is difficult to achieve; under standards heretofore adopted, a leakage flow up to 0.05 percent of the maximum flow rate $C_{vs}$ was therefore considered permissible.

The general object of my present invention is to provide an improved control valve whose performance can be accurately and reproducible regulated even in the region of near zero flow.

Another object is to provide a valve of this character which completely blocks the fluid flow in its position of zero lift.

A further object of my invention is to provide a valve of this description which is of compact construction and inexpensive to manufacture, owing to the utilization of commonly available components for a large part thereof.

Still another object is to provide a valve of this type whose flow-controlling body can be readily removed for purposes of inspection, repair or replacement, e.g. to alter its regulating characteristic, preferably with complete shutting off of the flow by ancillary means within the valve itself.

In accordance with the present invention, I provide a flow-control valve whose housing has two opposite ports, i.e. an inlet port and an outlet port connectable to a pair of at least approximately aligned conduits, this housing forming a fluid path between its ports as well as a lifting chamber transversely intersecting that path. A plunger is movable in the valve chamber, perpendicularly to the direction of flow, between a first position substantially blocking the fluid path and a second position establishing a throttled passage between the two ports, the rate of throttling in the latter position corresponding to the maximum rated value $C_{vs}$ of the flow coefficient $C_v$ as defined above. The body of the plunger terminates in a pair of parallel ridges which lie on opposite sides of the flow path and are separated by a depression or trough whose profile transverse to the path, in the aforesaid first position in which the two lateral ridges are received in an extension of the valve chamber, is substantially tangent to the (usually circular) outline of the ports.

With a cylindrical valve chamber and plunger body, the chamber may be formed in an insert which is rotatable about the cylinder axis and has lateral openings normally in comunication with the inlet and outlet ports; if such an insert is turned within the housing through an angle of about 90°, the ports are blocked independently of the position of the plunger so that the latter may be extracted without causing any appreciable leakage. The part of the insert provided with the lateral openings may be generally barrel-shaped, preferably with an easily machinable spherical curvature, in order to allow its lateral openings to be of substantially the same diameter as the ports of the housing.

The above and other features of my invention will be described in greater detail hereinafter with reference to the accompanying drawing in which.

Figure 2:
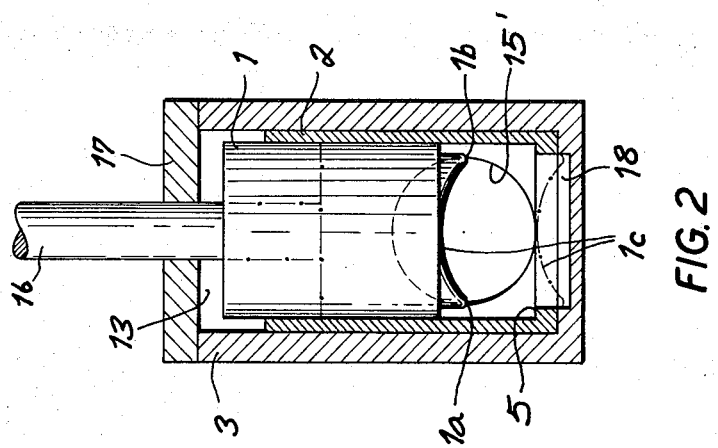
FIG. 2 is an end view of the valve taken on the line II—II of FIG. 1.
Figure 1:
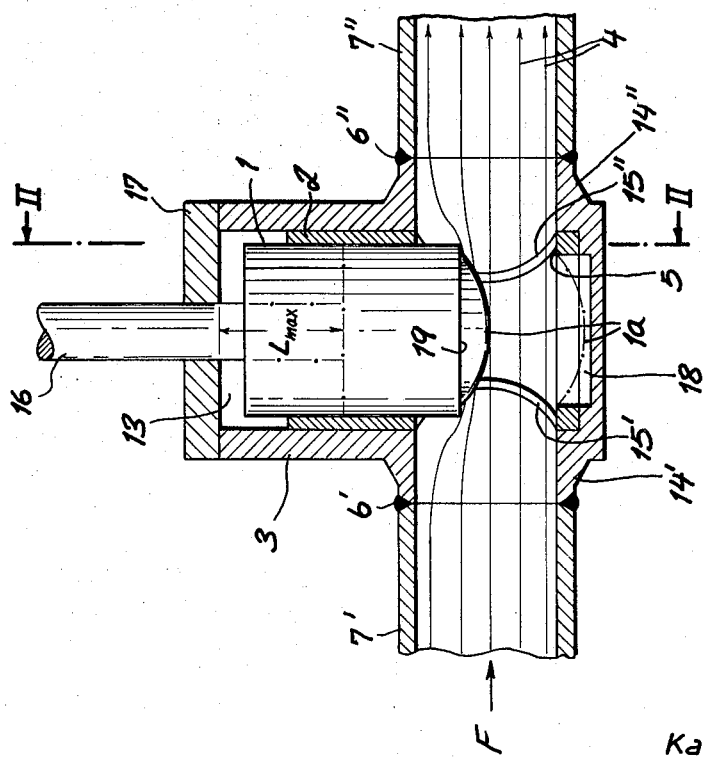
FIG. 1 is a sectional side-elevational view of a control valve embodying my invention.

In FIGS. 1 and 2 I have shown a valve comprising a housing 3 which forms a cylindrical chamber 13 whose axis is perpendicular to the flow direction F of a fluid stream 4 passing from a first conduit 7' to a second conduit 7" coaxially aligned therewith. Housing 3 has an inlet port 14' and an outlet port 14" which are joined to conduits 7', 7" by respective welding seams 6', 6". A tubular insert 2 with lateral openings 15', 15" in chamber 13 serves to guide a plunger 1 for vertical movement between a fully retracted position, in which the flow from conduit 7' to conduit 7" is only partly throttled, to a blocking position (dot-dash lines FIG. 1) in which that flow is cut off; in that blocking position, a peripheral zone 19 of the lower face of the cylindrical plunger 1 comes to rest on a ledge 5 formed by an internal shoulder of insert 2.

Plunger 1, whose stem 16 passes upwardly through a removable lid 17 of housing 3 to a servomotor (12, FIG. 3) for controlled displacement by electrical, hydraulic or pneumatic means, terminates at the bottom in a pair of transversely spaced ridges 1a, 1b separated by a depression 1c. The ridges 1a, 1b have a downwardly convex profile, as seen in FIG. 1, whereas the inverted trough 1c has a downwardly concave profile when viewed (FIG. 2) in the direction of the flow axis. Thus, the lower extremity of plunger 1 is a generally saddle-shaped formation which in a specific case may be designed as a parabolic hyperboloid. The enclosed bottom end of housing 3 has a recess 18 which forms an extension of chamber 13 and serves to accommodate the ridges 1a, 1b in the closure position in which the peripheral zone 19 of the plunger seats on the ledge 5.

The diameter of plunger 1 exceeds the diameter of the fluid passage at the bores 14', 14'' and at the openings 15', 15'' aligned therewith. With the outer diameter of the insert 2 only slightly larger, this insert is fixedly positioned in the transverse bore of housing 3 and does not function as an ancillary shutoff device. Such a function is performed, however, by a broadly similar insert 22 in the embodiment of FIGS. 3 and 4. In that embodiment, a valve housing generally designated 23 comprises a casting 23'' which forms the outlet port 24'' and a complementary attachment 23' forming the inlet port 24'. The two housing parts are detachably interconnected by screws 32 (only one shown). Part 23'' has a top opening closed by a lid 27 which is removably held in position by screws 26. Lid 27 has a central bore 28 for the stem 16 of plunger 1, this stem being slidably guided in a packing gland 29 urged into the bore 28 by screws 30 which bear upon a brace 31 to exert pressure upon a mass of lubricant in the bore. Annular grooves 11 in housing 23 accommodate gaskets 10 (e.g. rings of soft metal) which sealingly engage a barrel-shapd portion of insert 22 straddling the path of fluid stream 4. The outer diameter D of this barrel-shaped portion substantially exceeds the diameter d of the fluid passage defined by ports 24', 24'' and openings 25', 25'' in line therewith. The ratio of these diameters is so chosen that the insert 22, when rotated through 90° about the axis of plunger 1, obstructs the ports 24' and 24'' to block the flow of fluid 4. In this blocking position, therefore, the plunger may be extracted after removal of lid 27 and may be exchanged, if desired, by one of different profile.

In order to rotate the insert 22 about its vertical axis, the reduced neck of that insert is provided with peripheral gear teeth 33 meshing with a worm 34 on a stem 35 which carries a hand wheel 36. Abutments (not shown) may be provided to stop the rotary shutter 22 in two limiting positions 90° apart, or else the shutter may be rotatable through a full 360° if its orientation can be ascertained, for example, by visual inspection through a transparent portion of the housing.

A ball bearing 9 in the form of a single sphere is interposed between the bottom of housing part 23'' and the closed lower end of insert 22.

Servomotor 12 is shown supported in a mount 37 carried on the lid 27.

Figure 3:
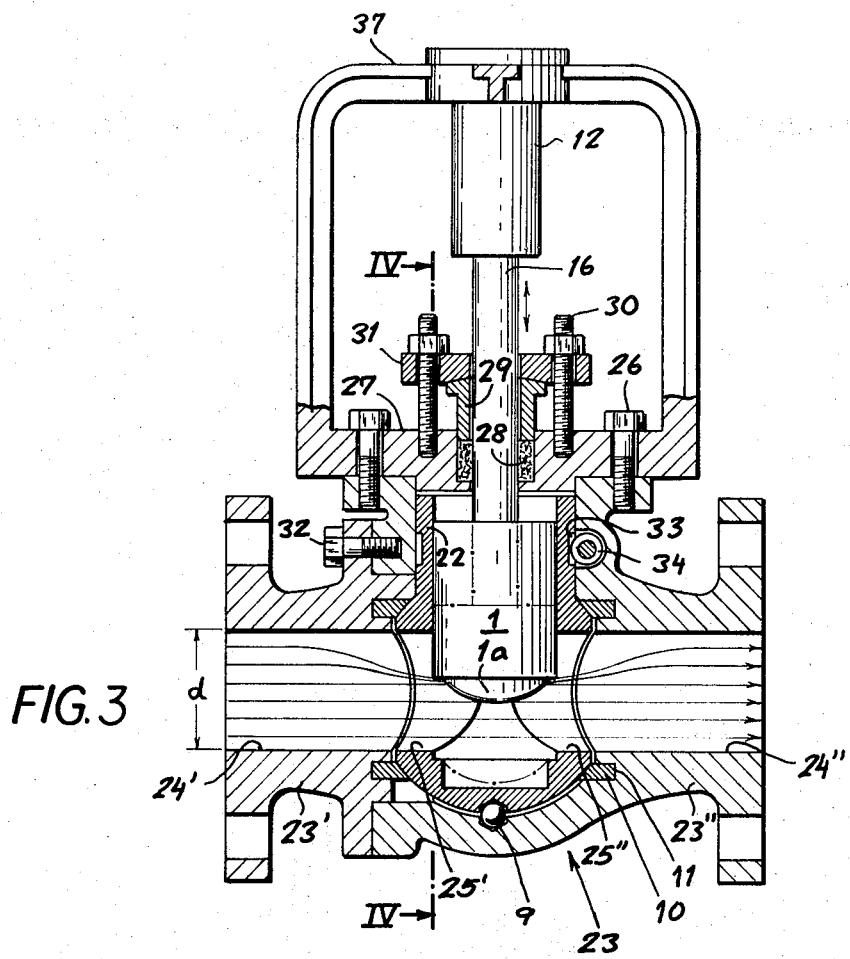
FIG. 3 is a side view similar to FIG. 1, showing an alternate embodiment.
Figure 4:
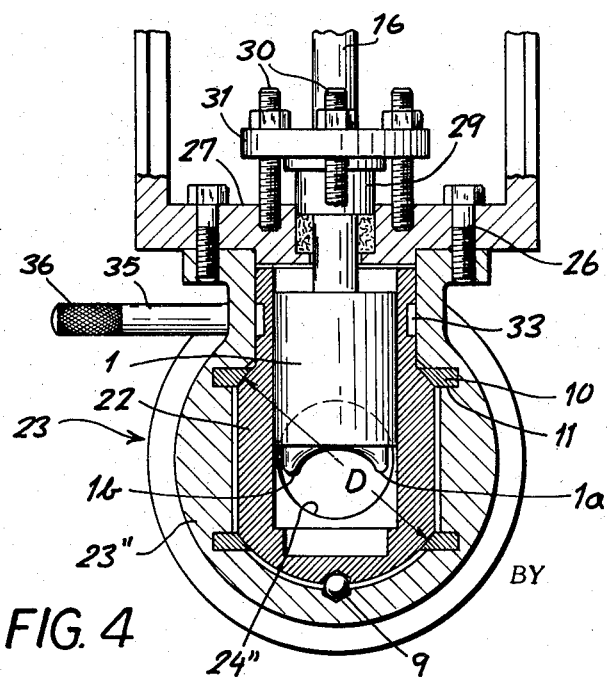
FIG. 4 is an end view partly in section on the line IV—IV of FIG. 3.
Figure 5:
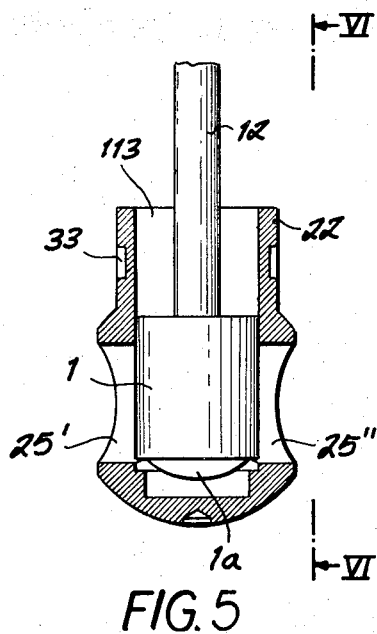
FIG. 5 is a sectional side elevation of an insert forming part of the valve shown in FIGS. 3 and 4, together with an associated plunger.
Figure 6A:
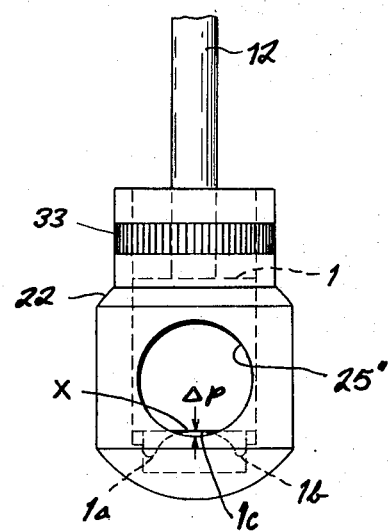
FIGS. 6a and 6b are end-elevational views of the assembly of FIG. 5, taken on the line VI—VI thereof, for two different plunger shapes.
Figure 6B:
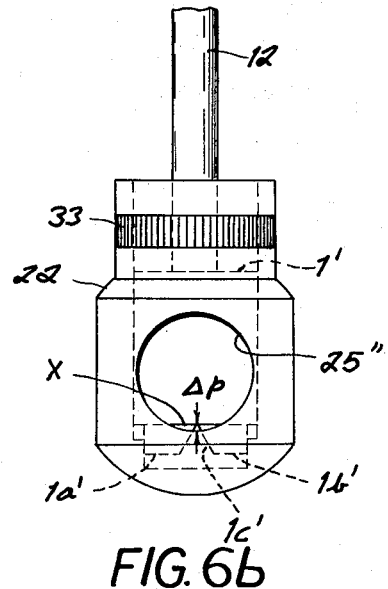

In FIG. 5 I have shown the insert 22 of FIGS. 3 and 4 together with its plunger 1 which is vertically reciprocable in the cylindrical chamber 113 thereof. FIG. 6a is an end view of that assembly, indicating that the plunger 1 has the same profile as in FIGS. 1 and 2 including a pair of lateral ridges 1a, 1b separated by a trough 1c. FIG. 6(b) shows a modified plunger 1' with ridges 1a', 1b' separated by a trough 1c' of trapezoidal profile. In both instances the plunger has been lowered into a position in which the valve is cracked open, with the bottom of the inverted trough 1c or 1c' located at a level X just above the nadir of openings 25', 25''. The clearance $\Delta p$ remaining in this position for the passage of the fluid disappears completely when the plunger is lowered to its bottom position illustrated in dot-dash lines in FIGS. 1 and 2 in which the profile of depression 1c or 1c' is just tangent to the outlines of the openings 25', 25'' (or 15', 15''), and, therefore, of the coextensive housing ports.

Figure 7:
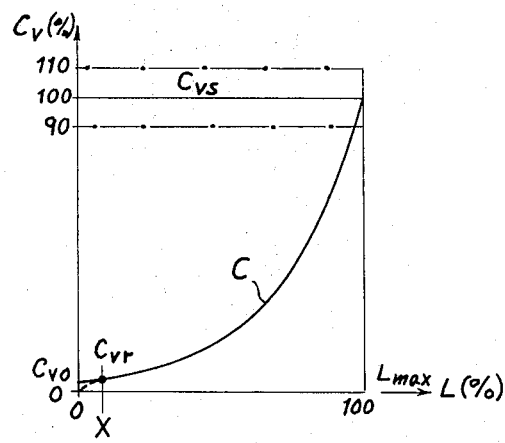
FIG. 7 is a graph showing the characteristic of a valve embodying my invention.

FIG. 7 shows a typical characteristic of a valve so constructed. In the graph I have plotted the flow coefficient $C_v$ against the lift L of the valve; the maximum flow rate with the valve fully opened ($L_{max} = 100$ percent) is shown at $C_{vs}$. In mass production, this level $C_{vs}$ represents an average from which individual specimens may depart by up to ± 10 percent as indicated in dot-dash lines in FIG. 7. Coefficient $C_v$ follows a generally parabolic curve down to a point $C_{vr}$ on an ordinate X corresponding to the similarly designated level of FIGS. 5, 6a and 6b. Whereas the theoretical curve C reaches a point $C_{vo} > 0$ for L = 0, the actual characteristic deviates from that curve at point $C_{vr}$ and descends to the origin (0, 0) at a readily calculated rate determined by the plunger profile, being thus different for the two profiles shown in FIGS. 6a and 6b.

If we consider the clearance $\Delta p$ as bounded by two circular arcs in the case of FIG. 6a and by an arc and a straight line (the minor base of the trapezoid) in the case of FIG. 6b, that clearance increases from zero twice as fast in the first case (assuming the two radii to be equal) than in the second case. This rate of increase can be further reduced by replacing the trapezoid of FIG. 6b with a triangle.

It will be apparent that the ports 14', 14'' or 24', 24'' need not be precisely coaxial, or centered on a line perpendicular to the direction of plunger motion, provided that the fluid passage within the valve housing is so shaped as to let the flow impinge substantially perpendicularly upon the periphery of the plunger.

In the absence of a rotary shutter built directly into the valve, as shown in FIGS. 3 and 4, a separate shutoff valve may be inserted upstream of the control valve in the conduit 7' (FIG. 1).

A valve embodying my invention can be used for a variety of purposes in the field of fluidics, including heating and cooling systems, hydration plants, chemical installations and any other system for generating, treating and conveying liquid or gaseous media. The servomotor 12 may be responsive automatically to a sensor elsewhere in the system, e.g. for maintaining a constant delivery pressure, but could also be replaced by a manual actuator.

I claim:

1. A valve for controlling the flow of a fluid between two aligned conduits, comprising:
    a housing provided with an inlet port and an outlet port opposite each other, said housing forming a fluid path between said ports and a chamber transversely intersecting said path; and
    a plunger in said chamber movable perpendicularly to said path between a first position blocking said path and a second postion establishing a throttled passage between said ports, said plunger having a body terminating in a pair of parallel ridges separated by a depression, said ridges flanking said path and being received in an extension of said chamber in said first position in which the profile of said depression in a plane perpendicular to said ridges and transverse to said path is substantially tangent to the outline of said ports as projected upon said plane.

2. A valve as defined in claim 1 wherein said housing is provided with an insert forming at least part of said chamber, said insert being provided with lateral openings in communication with said ports.

3. A valve as defined in claim 2 wherein said insert and said body are concentrically cylindrical, said insert being rotatable about the cylinder axis for obstructing said ports independently of the position of said plunger.

4. A valve as defined in claim 3 wherein said insert has a generally barrel-shaped extremity provided with said lateral openings, said extremity being accommodated in a spherically curved enlargement of said passage.

5. A valve as defined in claim 4 wherein said housing is provided with bearing means in said enlargement supporting a closed end of said insert.

6. A valve as defined in claim 5 wherein said bearing means comprises a ball centered on said axis.

7. A valve as defined in claim 1 wherein said extension of said chamber forms a seat for an annular ledge of said body surrounding said ridges.

8. A valve as defined in claim 1 wherein said profile is of generally arcuate curvature.

9. A valve as defined in claim 8 wherein said ridges and said depression define a face of substantially parabolically hyperboloidal configuration.

10. A valve as defined in claim 1 wherein said profile is generally trapezoidal.

* * * * *